US005733981A

United States Patent [19]

Coggio et al.

[11] Patent Number: 5,733,981
[45] Date of Patent: Mar. 31, 1998

[54] AQUEOUS DEHYDROFLUORINATION METHOD

[75] Inventors: William D. Coggio, Woodbury; Trang D. Pham, Bloomington, both of Minn.

[73] Assignee: Minnesota Mining and Manufacturing Company, St. Paul, Minn.

[21] Appl. No.: 703,422

[22] Filed: Aug. 26, 1996

[51] Int. Cl.$^6$ .................... C08F 8/26; C08F 6/14
[52] U.S. Cl. ............ 525/326.2; 528/488; 528/489; 528/499; 528/502; 524/544; 524/545; 524/546; 524/462; 524/463; 525/199; 526/255
[58] Field of Search .................... 528/488, 489, 528/499, 502; 524/544, 545, 546, 462, 463; 525/199, 326.2, 326.4; 526/255

[56] References Cited

U.S. PATENT DOCUMENTS

| | | | |
|---|---|---|---|
| 3,507,844 | 4/1970 | Wood | 260/87.7 |
| 3,752,789 | 8/1973 | Khan | 528/488 |
| 4,645,799 | 2/1987 | Wachi et al. | 525/199 |
| 4,678,842 | 7/1987 | Sandler | 525/359.1 |
| 4,718,618 | 1/1988 | Ichizuka | 242/195 |
| 4,742,126 | 5/1988 | Moggi et al. | 525/340 |
| 4,758,618 | 7/1988 | Ito et al. | 524/430 |
| 4,946,902 | 8/1990 | Bekiarian et al. | 525/326.2 |
| 5,180,803 | 1/1993 | Gibbard | 528/488 |
| 5,285,002 | 2/1994 | Grootaert | 526/222 |
| 5,367,023 | 11/1994 | Caporiccio et al. | 525/102 |

OTHER PUBLICATIONS

Kise et al., "Phase Transfer Catalysis is Dehydrofluorination of Poly(vinylidene Fluoride) by Aqueous Sodium Hydroxide Solutions," Journal of Polymer Science: Polymer Chemistry Edition, vol. 12, pp. 3443–3451, (1983).

Brewis et al., "Pretreatment of poly(vinyl fluoride) and poly(vinylidene fluoride) with potassium hydroxide," Int. J. Adhesion and Adhesives, vol. 16, No. 2, pp. 87–95 (1996).

George Odian, Principles of Polymerization, pp. 332–333 (2nd ed. 1981).

Kirk–Othmer Encyclopedia of Chemical Technology, vol. 8, pp. 990–1003 (4th ed. 1993).

Cirillo et al., "Fluoroelastomers: Reaction Products in Early Stages of Network Formation," Biological and Synthetic Polymer Networks, 255–265 (1988).

Primary Examiner—Vasu Jagannathan
Assistant Examiner—Olga Asinovsky
Attorney, Agent, or Firm—Daniel C. Schulte

[57] ABSTRACT

A method of dehydrofluorinating a fluoropolymer comprising the steps of: providing an fluoropolymer emulsion comprising water, a fluoropolymer, and substantially no organic solvent; adding to the fluoropolymer emulsion a basic compound, the base compound being added at a concentration and in an mount that does not result in coagulation of the fluoropolymer; and exposing the mixture of fluoropolymer emulsion and basic compound to reaction conditions sufficient to cause dehydrofluorination of the fluoropolymer.

10 Claims, No Drawings

AQUEOUS DEHYDROFLUORINATION METHOD

FIELD OF THE INVENTION

The present invention relates to a method of dehydrofluorinating a fluoropolymer.

BACKGROUND

Carbon-carbon unsaturation is desirable in fluoropolymers for a number of reasons. Unsaturated fluorocarbons can be ingredients or intermediates in the production of other fluorinated materials. For example Moggi et at., Fluoroelastomers: Reaction Products in Early Stages of Network Formation, Biol. Synth. Polym. Networks, 255, (1988) describe unsaturated fluoropolymers as a precursor to a vulcanized fluoroelastomer thermoset article. In a distinct application, dehydrofluorinated polyvinylidene fluoride has been found to result in an electrically conducting polymer.

There exist a number of methods by which unsaturation may be introduced into a fluoropolymer. A possible reaction sequence includes the elimination of HF from the fluoropolymer backbone by a basic reagent such as KOH, to produce carbon-carbon unsaturation.

The current state of the art of dehydrofluorination includes three main dehydrofluorination methods. According to homogeneous solution dehydrofluorination methods, fluoropolymers that are soluble in organic solvents (e.g., tetrahydrofuran, dimethyl acetamide, dimethylsulfonamide, dimethylformamide, and others) can be treated with a base such as a tertiary amine, tetraalkylammonium hydroxide compound, or metal alkoxide such as sodium methoxide, to produce an unsaturated fluoropolymer. For example, Wood et al., U.S. Pat. No. 3,507,844, describe a dehydrofluorination method using solvents such as hot dimethylformamide. Also, Ito et al. (U.S. Pat. No. 4,758,618) describe dehydrofluorination using an alkaline solution, and specify the need for an onium phase transfer catalyst and/or a cosolvent.

A disadvantage of homogeneous solution dehydrofluorination methods is that these methods only allow dehydrofluorination of fluoropolymers that are soluble in organic solvents. Additionally, although homogeneous solution dehydrofluorination methods are faster and easier to control than some other dehydrofluorination methods, the use of solvent is undesirable due to the harmful impact that organic solvents produce on the environment, and the present trend toward elimination of solvent-based processes. Finally, dehydrofluorinated fluoropolymer prepared by solvent-based methods typically require subsequent processing of the fluoropolymer (e.g., workup and purification), which adds complication and cost to production methods.

According to two-phase solution dehydrofluorination methods, unsaturation of a fluoropolymer can be achieved by dissolving a fluoropolymer in a water immiscible solvent (e.g., MIBK), and mixing this solution with a second, aqueous phase that contains an alkali metal hydroxide and a phase transfer catalyst. (See U.S. Pat. No. 4,742,126 to Moggi et al.). Two-phase solution dehydrofluorination methods such as these also require the use of organic solvents, and only allow dehydrofluorination of fluoropolymers that are soluble in organic solvent.

A third type of dehydrofluorination method are bulk dehydrofluorination methods, wherein fluoropolymers undergo dehydrofluorination by treatment with an excess of a basic reagent and optionally a phase transfer catalyst, in bulk. As one example of a bulk technique, a mixture of fluoropolymer and $Ca(OH)_2$ can be thermally extruded at a temperature of around 200° C., resulting in a loss of HF from the fluoropolymer backbone, and carbon-carbon unsaturation. A drawback of bulk dehydrofluorination processes is the requirement of a large stoichiometric excess of basic reagent, and the need for elevated temperatures. The required temperatures can cause degradation of the fluoropolymer due to chain cleavage reactions, which results in loss of molecular weight and mechanical properties of the fluoropolymer. Furthermore, although extrusion methods result in a dehydrofluorinated fluoropolymer, there is little control over the amount of unsaturation produced within the dehydrofluorinated fluoropolymer, and there is no easy method to remove the base residue from the dehydrofluorinated fluoropolymer.

What is needed but not provided by the prior art is a method of dehydrofluorinating a fluoropolymer wherein dehydrofluorination takes place in an aqueous solution.

SUMMARY OF THE INVENTION

In the practice of the present invention an aqueous fluoropolymer emulsion can be treated with a base compound to produce unsaturation within the fluoropolymer. The reaction can preferably be accomplished under relatively mild conditions, and without the need for organic solvent or a phase transfer catalyst. Because dehydrofluorination takes place within an aqueous fluoropolymer emulsion, there is no requirement that the fluoropolymer be soluble in organic solvent, and therefore it becomes possible to dehydrofluorinate fluoropolymers that are insoluble in organic solvent. Furthermore, the amount of unsaturation within the dehydrofluorinated fluoropolymer can be controlled by selection of the base compound, the fluoropolymer, and the dehydrofluorination reaction conditions (e.g., reaction temperature and reaction time). The resulting dehydrofluorinated fluoropolymer materials preferably do not contain any residual base or metal fluoride salt residues, residual solvents, or residual catalyst.

An aspect of the present invention relates to a method of dehydrofluorinating a fluoropolymer. By the method, a fluoropolymer emulsion is provided that contains water and a fluoropolymer comprising a structural segment having the general formula:

wherein X and X' are each independently either hydrogen or an electron-withdrawing group. The hydrogen atom is sufficiently acidic to result in dehydrofluorination of the fluoropolymer upon the addition of a base compound to the fluoropolymer emulsion. The base compound is added to the fluoropolymer emulsion at a concentration and in an amount that will not cause coagulation of the fluoropolymer. The fluoropolymer emulsion preferably contains substantially no organic solvent or phase transfer catalyst. The fluoropolymer emulsion is exposed to reaction conditions sufficient to cause dehydrofluorination of the fluoropolymer.

The dehydrofluorinated fluoropolymer emulsion prepared by the method of the present invention can be used in the same manner as an untreated (i.e., non-dehydrofluorinated) fluoropolymer emulsion. For example, the dehydrofluorinated fluoropolymer can be coagulated and washed, or it can be spray-dried. Additionally, once the dehydrofluorinated fluoropolymer has been processed (e.g., washed and/or coagulated, etc.), the dehydrofluorinated fluoropolymer can be treated similarly to dehydrofluorinated fluoropolymer that has been dehydrofluorinated by other known dehydrofluorination methods.

As used within the present description, the term "coagulation" refers to the condition of fluoropolymer precipitation out of the fluoropolymer emulsion as a solid. Coagulation can occur due to the creation of an instability within the emulsion, which can be caused by the addition of a sufficiently concentrated base compound to the fluoropolymer emulsion.

DETAILED DESCRIPTION

The present invention provides a method of dehydrofluorinating a fluoropolymer present in a fluoropolymer emulsion. The phrase "fluoropolymer emulsion" refers to an aqueous emulsion that contains fluoropolymer, water, and optionally a suitable emulsifying surfactant, and that contains substantially no organic solvent; e.g., less than about 5% by weight organic solvent, preferably less than about 1% by weight organic solvent, and more preferably less than about 0.5% by weight organic solvent. Even more preferably, the fluorepolymer emulsion consists essentially of fluoropolymer, an emulsifying surfactant, and water.

The fluoropolymer can be any fluorinated polymer, copolymer, or oligomer that contains somewhere within its structure a structural sequence a carbon atom substituted with a fluorine atom and a chemical group X, adjacent to a carbon atom substituted with a hydrogen atom and an X' group. This structural sequence provides a reaction site for the dehydrofluorination reaction, and can be represented generally by formula (I):

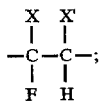

(I)

In formula 1, X and X' each represent a hydrogen atom or an electron-withdrawing group. Preferably, at least one of the X or X' groups is an electron withdrawing group that exhibits sufficient electron-withdrawing power that the hydrogen atom bonded to the carbon atom adjacent to the fluorinated carbon atom is sufficiently acidic to undergo dehydrofluorination upon exposure to a base. For instance, some preferred electron withdrawing groups include fluorine, lower fluoroalkyls such as fluoromethyl and fluoroethyl, with perfluorinated groups being particularly preferred, including —$CF_3$, —$C_2F_5$, $C_4F_9$, etc., and lower fluoroalkoxys, including —$CF_2OR$, —$C_2F_4OR$, etc., wherein R can be a lower alkyl or fluoroalkyl group. The identity of the X and X' groups can also depend on other factors such as the presence of other electron withdrawing groups near the hydrogen atom.

The fluoropolymer can be any fluoropolymer comprising the above identified structural sequence. Such fluoropolymers are among the polymers, copolymers, terpolymers, and oligomers described in The Kirk-Othmer Encyclopedia of Chemical Technology, Volume 8, pages 990–1003 (4th ed. 1993). The fluoropolymer can be prepared from monomers comprising olefinic fluorinated monomers, including one or more of vinylidene fluoride (VDF), hexafluoropropylene (HPF), and tetrafluoroethylene (TFE), among others. Optionally, the fluoropolymer can be prepared from monomers further comprising other fluorinated olefinic monomers, or non-fluorinated olefinic monomers, including chlorotrifluoroethylene, trifluoroethylene, vinyl fluoride, a perfluoro(alkyvinyl ether), a perfluoro(alkoxyvinyl ether), ethylene, propylene, isobutylene, and the like.

The particular monomers used to produce the fluoropolymer, and the respective amounts of each, can be selected depending upon the desired properties of the final fluoropolymer, including mechanical properties such as heat resistance, low temperature flexibility, chemical resistance, etc. Preferred fluoropolymers can be derived from tetrafluoroethylene, hexafluoropropylene, vinylidene fluoride, and perfluoroalkyl vinyl ethers, such as perfluoromethylvinyl ether and perfluorobutylvinyl ether. Some particularly preferred fluoropolymers are derived from about 0 to 65 mole percent tetrafluoroethylene, about 5 to 30 mole percent hexafluoropropylene, and about 5 to 95 mole percent vinylidene fluoride, based on a total of 100 moles of tetrafluoroethylene, hexafluoropropylene, and vinylidene fluoride monomer.

The fluorinated and optional non-fluorinated monomers can be polymerized to produce an aqueous fluoropolymer emulsion by aqueous polymerization methods that are known in the fluoropolymer art, including those described by Kirk-Othmer, supra. These include, for example, emulsion polymerization methods and suspension polymerization methods. These aqueous polymerization methods provide fluoropolymer emulsions that contain little or substantially no organic solvent.

The fluoropolymer can be in either a crystalline or an amorphous state within the fluoropolymer emulsion, and preferably exists in an emulsion having from about 5 to 40 percent by weight solids, more preferably from about 25 to 35 weight percent solids, in water.

The emulsifying surfactant within the fluoropolymer emulsion can be one of various emulsifying surfactant known in the fluoropolymer emulsion art. These include, for example, anionic surfactants such as fatty acid soaps (sodium or potassium stearate, laurate, palmitate), sulfates and sulfonates (sodium lauryl sulfate and sodium dedecylbenzene sulfonate), nonionic surfactants such as poly (ethylene oxide), poly(vinyl alcohol) and hydroxyethyl cellulose, and fluorinated surfactants including perfluorinated carboxylic acids. These and other emulsifying surfactants can be used alone or in combinations of two or more emulsifying surfactants, and can be present in any effective amount; i.e., and amount that will result in an emulsion. (See, e.g., George Odian, Principles of Polymerization, 332–3 (2nd ed. 1981)).

Fluoropolymers that have been found to be useful in the practice of the present invention are also commercially available. For instance suitable commercially available fluoropolymer emulsions include fluoropolymer emulsions commercially available from The Minnesota Mining and Manufacturing Company (3M) under the trade names THV 230R, THV 400, THV 530R FC™-2230, and FT™-5830.

The base compound can be any base compound that, when added to the fluoropolymer emulsion, will react at the above-described reaction site of the fluoropolymer to remove a hydrogen atom and a fluorine atom from the reaction site, and thereby create carbon-carbon unsaturation in the fluoropolymer. The base compound can be, for example, a hydroxide such as potassium hydroxide (KOH), ammonium hydroxide ($NH_4OH$), sodium hydroxide (NaOH), lithium hydroxide (LiOH); or a carbonate such as potassium carbonate ($K_2CO_3$), sodium carbonate ($Na_2CO_3$), etc.

The base compound is added to the fluoropolymer emulsion to produce what is referred to herein as an "aqueous reaction solution." The base compound can be added to the fluoropolymer emulsion at any concentration, and in any amount, that will not cause coagulation of the fluoropolymer within the aqueous reaction solution. Preferably, the base compound is added to the fluoropolymer emulsion as a relatively weak, basic solution. Weak basic solutions are preferred over relatively stronger basic solutions in order to prevent coagulation. On the other hand, the use of a weaker basic solution can result in a longer reaction time to achieve a desired amount of dehydrofluorination of the fluoropolymer. Therefore, the need to avoid coagulation of the fluoropolymer should be balanced with the need to provide an efficient dehydrofluorination process.

An appropriate concentration of base compound within the basic solution (i.e., a concentration that will not result in coagulation of the fluoropolymer within the aqueous reaction solution) can depend on factors such as the particular base compound chosen and the particular fluoropolymer emulsion used. As an example, a basic solution of potassium hydroxide (KOH) can be added to a fluoropolymer emulsion at a KOH concentration of up to about 0.3 normality, without causing coagulation of the fluoropolymer. For other bases, this limit will differ. $NH_4OH$ can be added to a fluoropolymer emulsion as a 1.0N basic solution without causing coagulation, and is even useful when added as a concentrated basic solution (i.e., 15.7N).

The concentration of the base compound in the aqueous reaction solution can be any concentration of the base compound that is sufficient to result in effective dehydrofluorination of the fluoropolymer, and that will not cause coagulation of the fluoropolymer. The lower limit of the concentration of base compound in the aqueous reaction solution can be considered to be the lowest concentration that will effectively dehydrofluorinate the fluoropolymer. The upper limit will be the greatest amount of base compound that can be present without causing coagulation of the fluoropolymer. The proper concentration of the base compound within the aqueous reaction solution will vary with factors such as the identity of the base compound and the fluoropolymer emulsion,—e.g., the exact fluoropolymer and the percent solids of fluoropolymer in the fluoropolymer emulsion. Also, it has been found that the upper concentration limit of the base compound within the aqueous reaction solution can vary depending on the concentration of the base in the basic solution that is added to the fluoropolymer. The higher the concentration of base in the basic solution added to the fluoropolymer emulsion, the more likely it will be that addition of the base solution to the fluoropolymer emulsion will cause coagulation of the fluoropolymer. As an example, a basic solution of KOH can be added to a fluoropolymer emulsion at a concentration of 0.3N to provide a KOH concentration in the aqueous reaction solution up to 0.18 meq (milliequivalents) KOH per gram emulsion, without causing coagulation. By adding the KOH as basic solution having a lower concentration (e.g., 0.20N), the upper limit of KOH that can be present in the aqueous reaction solution without causing coagulation increases to about 0.50 meq KOH/g emulsion. For $NH_4OH$, a 0.3N basic solution can be added to a fluoropolymer emulsion to create an aqueous reaction solution having 1.50 meq $NH_4OH$ per gram fluoropolymer emulsion without causing coagulation. When $NH_4OH$ is added to the fluoropolymer as a basic solution having a concentration of 0.1N, the upper limit of the base concentration within the aqueous reaction solution is about 1.01 meq $NH_4OH$ per gram fluoropolymer emulsion without causing coagulation. Concentrated $NH_4OH$ (15.7N) can be added to a fluoropolymer emulsion to create an aqueous reaction solution having a concentration of 6.34 meq $NH_4OH$ per gram emulsion. The fluoropolymer of this aqueous reaction solution does not coagulate, yet the solution can gel when heated overnight. Similar upper concentration limits oft base compound within the aqueous reaction solution will be apparent for other useful base compounds.

In the practice of the present invention, the fluoropolymer is dehydrofluorinated by exposing the aqueous reaction solution comprising the fluoropolymer emulsion and the base compound to reaction conditions sufficient to cause the base compound to react across the CFX—CHX' reaction site of the fluoropolymer, and to thereby remove a hydrogen atom and a fluorine atom from the fluoropolymer to produce an unsaturated —CX=CX'—sequence within the fluoropolymer. "Reaction conditions" refers to such factors as the temperature to which the aqueous reaction solution is exposed, and the time allowed for reaction. The dehydrofluorination reaction temperature can be any useful temperature, and can depend on the particular identity of the different components of the aqueous reaction solution. In the practice of the present invention, however, the reaction temperature can be relatively mild, for instance in the range from about 40 to 100 degrees Celsius. Likewise, the length of time of the dehydrofluorination reaction (reaction time) can be chosen depending on the identity of the different components of the aqueous solution, the reaction temperature, and the desired degree of unsaturation. The reaction time can be any useful reaction time, but can preferably be in the range from about thirty minutes to 100 hours. The use of higher temperatures generally allows a shorter reaction time, and vice-versa.

In the practice of the present invention, the extent of dehydrofluorination of the fluoropolymer can be controlled to result in a desired level of dehydrofluorination, by appropriately choosing the fluoropolymer emulsion, the base compound the concentration of base compound within the aqueous reaction solution, and the above-identified reaction conditions. For example, by controllingone or more of these factors, the amount of dehydrofluorination produced within the fluoropolymer can be controlled such that from about 0 to 5 or 10 mole percent of the monomeric units used to prepare the fluoropolymer contain carbon-carbon unsaturation, as measured by NMR spectroscopy.

The present method will now be described by the following non-limiting examples.

EXAMPLES

Example 1:

Dehydrofluorinated fluoropolymer Samples 1 through 5 were prepared from 100 grams of THV™230R fluoropolymer emulsion from 3M Co. (a 30% solids emulsion in water which is a crystalline terpolymer derived from 42 mol % tetrafluoroethylene, 20 mol % hexafluoropropylene and 38 mol % vinylidene fluoride monomers). IR analysis of the fluoropolymer emulsion showed no peak at 1723 $cm^{-1}$, indicating no carbon-carbon unsaturation within the fluoropolymer. To the fluoropolymer emulsion was added an appropriate amount of a basic 0.2M KOH solution (0.5 meq KOH/g-fluoropolymer emulsion) to provide an aqueous reaction solution having the concentrations of base compound (KOH) (meq KOH/g emulsion) reported in Table 1. For example, in Sample 1, 100 grams of THV™230R was mixed with 225 grams of 0.2M KOH basic solution to provide a meq base/g-fluoropolymer emulsion ratio of 0.5. The ingredients were added to a 500 ml (milliliter) one-necked flask equipped with a magnetic stir bar. The flask was immersed in a constant temperature oil bath at 80° C. Within two hours the solution was light brown in color with no evidence of any significant amount of coagulated polymer. The extent of reaction was monitored by titration of a small aliquot of the aqueous reaction solution with 0.1N HCl to determine the amount of unreacted base present, which was then converted to the amount of base that had reacted with the fluoropolymer.

The dehydrofluorinated fluoropolymer was coagulated from the aqueous reaction solution by precipitating the reacted solution into a 20% solution of $MgCl_2$. The coagulated polymer was collected by filtration and washed with DI water (about 2L) and dried. The dried polymer was then characterized by NMR and IR spectroscopies. The $^{19}$F NMR spectra consisted of new resonances at −56 ppm (parts per million) and −62 ppm, (upfield from external $CFCl_3$) which correspond to unsaturated units of —CF=C(CF_3)—. The IR spectral data showed a new signal at 1723 $cm^{-1}$, which is consistent for a fluoroolefin. The intensity IR signal at 1723 $cm^{-1}$ was then compared to a C-C bend band at 824 $cm^{-1}$ and a ratio of these bands could then provide a relative comparison of the amount of dehydrofluorination. Under these reaction conditions the dehydrofluorinated fluoropolymers were found to contain up to about 1.3 mol % unsaturation.

TABLE 1

| Sample | meq KOH/g-emulsion (added as 0.2N KOH basic solution) | % base Consumed* | C=C content mol % by NMR** | C=C ratio by IR† |
|---|---|---|---|---|
| 1 | 0.5 | 91 | 1.26 | 0.33 |
| 2 | 0.4 | 97 | 1.22 | 0.35 |
| 3 | 0.3 | 96 | 1.32 | 0.39 |
| 4 | 0.2 | 97 | 1.19 | 0.27 |
| 5 | 0.1 | 100 | 0.87 | 0.18 |

*determined by titration with 0.1N HCl
**determined by 19F NMR spectroscopy
†Ratio of IR signal intensity at 1723 $cm^{-1}$/823 $cm^{-1}$
Reaction Time approximately 15 hrs.

The data of Table 1 show that fluoropolymers can be dehydrofluorinated readily to a level of greater than about 1.3 mol % unsaturation, as measured by NMR spectroscopy, by the method of the present invention, without causing precipitation of the fluoropolymer.

Example 2:

In an experiment similar to Example 1, samples of THV™230R emulsion were reacted with 0.4 meq KOH/g emulsion at different temperatures to determine if the amount of dehydrofluorination could be changed with changing reaction temperature. To produce dehydrofluorinated fluoropolymer Samples 6–9, 100g of THV™230R emulsion was mixed with 200 g of 0.2M KOH in a one-necked flask. For Sample 6, the flask was placed in a constant temperature oil bath at 40° C. for 4 days. The consumption of the base was monitored as a function of time by titration of the residual base with 0.1N HCl. The reaction was stopped after the consumption of the base appeared to level off. The dehydrofluorinated fluoropolymer emulsion was coagulated, washed and characterized (via NMR and IR spectroscopies) as described previously in Example 1. Sample 7, 8, and 9 were prepared by a similar method except at reaction temperatures of 60°, 80°, 100° C. respectively, and for the reaction times reported in Table 2.

TABLE 2

| Sample | meq KOH/g-emulsion | Rxn Temp. (°C.) | Rxn Time (hrs) | % Base Consumed* | C=C (mol %) by NMR** | C=C IR by ratio† |
|---|---|---|---|---|---|---|
| 6 | 0.4 | 40 | 96 | 79 | 0.54 | 0.15 |
| 7 | 0.4 | 60 | 22 | 87 | 0.88 | 0.18 |
| 8 | 0.4 | 80 | 20 | 96 | 1.4 | 0.22 |
| 9 | 0.4 | 100 | 6 | 100 | 1.6 | 0.27 |

*determined by titration with 0.1N HCl
**determined by 19F NMR spectroscopy
†Ratio of IR signal intensity at 1723 $cm^{-1}$/823 $cm^{-1}$ The results of Table 2 indicate that the amount of unsaturation produced within the fluoropolymer can be controlled by adjusting the reaction temperature and reaction time. Specifically, increased reaction temperature can result in greater dehydrofluorination and/or a shorter reaction time.

Example 3:

THV$^{198}$ 530R is a fluoropolymer emulsion available from 3M Co., (a 30% solids crystalline terpolymer emulsion containing 60 mol % tetrafluoroethylene, 18mol % hexafluoropropylene and 22 mol % vinylidene fluoride) was reacted with 0.4 meq KOH/g emulsion at different temperatures to show that in the practice of the present invention, the degree of dehydrofluorination of this fluoropolymer could be controlled as a function of reaction temperature. In Example 10, 100g of THV$^{198}$ 530R fluoropolymer emulsion was mixed with 400 g of 0.1M KOH in a one-necked flask, and the flask was placed in a constant temperature oil bath at 40° C. for 4 days. The total consumption of the base was determined by titration of the residual base with 0.1N HCl after the reaction times listed in Table 3. The resulting dehydrofluorinated fluoropolymer was coagulated and washed as described for Example 1. The dehydrofluorinated fluoropolymer was characterized by NMR and IR spectroscopy as described previously. Samples 11, 12, and 13 were prepared by a similar method, except at reaction temperatures of 60°, 80°, 100° C. respectively, and for the times reported in Table 3.

TABLE 3

| Sample | meq KOH/g-emulsion | Rxn Temp. (°C.) | Rxn Time (hrs) | % Base Consumed* | C=C (mol %) by NMR** | C=C by IR ratio† |
|---|---|---|---|---|---|---|
| 10 | 0.4 | 40 | 96 | 73 | — | 0.13 |
| 11 | 0.4 | 60 | 22 | 76 | — | 0.15 |
| 12 | 0.4 | 80 | 20 | 98 | — | 0.19 |
| 13 | 0.4 | 100 | 6 | 99 | — | 0.29 |

*determined by titration with 0.1N HCl
**determined by 19F NMR spectroscopy
†Ratio of IR signal intensity at 1723 $cm^{-1}$/823 $cm^{-1}$ THV™530 is not soluble in common solvent and therefore no NMR analyses were possible.

The data shown in Tables 1–3 indicate that the dehydrofluorination of a fluoropolymer emulsion can be controlled by adjusting the concentration of base compound within the aqueous reaction solution, the reaction temperature and the reaction time. The amount of dehydrofluorination can be increased by use of higher reaction temperatures, and increasing the amount (milliequivalents) of base compound added to the aqueous reaction solution.

Example 4:

Similar experiments were carried out for different fluoropolymer emulsion systems, and with different base compounds. The experimental methods were similar to those as described for Examples 1–3. The data are listed in Tables 4 and 5.

TABLE 4

| Fluoropolymer | meq KOH/g-emulsion | Rxn Temp (°C.) | Rxn Time (hrs) | % Base Consumed* | C=C (mol %) by NMR** | C=C by IR ratio† |
|---|---|---|---|---|---|---|
| FC2230 ™ | 0.1 | 80 | 16 | >90% | 0.9 | # |
| FC2230 ™ | 0.3 | 80 | 16 | >90% | 1.1 | # |
| FT-5830 ™ | 0.1 | 80 | 16 | >90% | 3.7 | 0.51 |
| FT-5830 ™ | 0.3 | 80 | 16 | >90% | 1.2 | 0.93 |

*determined by titration with 0.1N HCl
**determined by 19F NMR spectroscopy
†IR ratio of IR signal intensity at 1723 cm$^{-1}$/823 cm$^{-1}$
-IR ratio for copolymers was not available by this method since the copolymer does not contain the IR band at 823 cm$^{-1}$.

FC 2230™ fluoropolymer emulsion, available from 3M Co., is a fluoroelastomer copolymer containing 78 mol % vinylidene fluoride and 22 mol % hexafluoropropylene.

FT 5830™ fluoropolymer emulsion, available from 3M Co., is a 30% solids terpolymer elastomer emulsion containing 26 mol % tetrafluoroethylene; 25 mol % hexafluoropropylene; 49.5 mol % vinylidene fluoride.

| Fluoropolymer | Base | Meq Base/gram Emulsion | Rxn Temp (°C.) | Rxn Time (hrs) | % Base Consumed | C=C (mol %) by NMR | C=C by IR ratio |
|---|---|---|---|---|---|---|---|
| THV-230R | NH$_4$OH | 0.40 | 80 | 20 | 76 | 0.26 | 0.0131 |
| THV-230R | K$_2$CO$_3$ | 0.25 | 80 | 6* | 80 | — | — |

*Aqueous reaction solution gelled overnight.

What is claimed is:

1. A method of dehydrofluorinating a fluoropolymer comprising the steps of:

a) providing a fluoropolymer emulsion comprising water and a fluoropolymer comprising a structural sequence having the general formula:

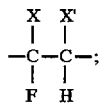

(I)

wherein X and X' are independently hydrogen or an electron withdrawing group, wherein the electron withdrawing group is fluorine, a fluorinated alkyl, or a fluorinated alkoxy, and less than about 5% organic solvent;

b) adding to the fluoropolymer emulsion a base compound to form an aqueous reaction solution, the base compound being such that it removes a hydrogen atom and a fluorine atom from the structural sequence and create carbon-carbon unsaturation, the base compound being added at a concentration and in an amount that does not result in coagulation of the fluoropolymer; and c) exposing the aqueous reaction solution to reaction conditions to cause dehydrofluorination of the fluoropolymer.

2. The method of claim 1, wherein the fluoropolymer is comprised of polymerized monomeric units including one or more of vinylidene fluoride, hexafluoropropylene, and tetrafluoroethylene.

3. The method of claim 2, wherein the fluoropolymer is derived from:

about 5 to 95 mole percent vinylidene fluoride monomeric units;

about 5 to 30 mole percent hexafluoropropylene monomeric units; and about 0 to 65 mole percent tetrafluoroethylene monomeric units.

4. The method of claim 2, wherein the fluoropolymer is comprised of polymerized monomeric units further comprising one or more of propylene and ethylene.

5. The method of claim 1, wherein the electron withdrawing group is a perfluorinated alkyl group.

6. The method of claim 5, wherein the perfluorinated alkyl group has from 1 to 4 carbon atoms.

7. The method of claim 1, wherein the base compound is an alkali metal hydroxide or a carbonate salt.

8. The method of claim 5, wherein the base compound comprises a compound chosen from the group consisting of an alkali metal hydroxide, ammonium hydroxide, and mixtures thereof.

9. The method of claim 1, wherein, during step (c), the aqueous reaction solution is heated to a temperature in the range from about 40 to 100 degrees Celsius.

10. The method of claim 1, wherein during step (c), the fluoropolymer emulsion is heated for a time ranging from about 30 migrates to 100 hours.

* * * * *

UNITED STATES PATENT AND TRADEMARK OFFICE
CERTIFICATE OF CORRECTION

PATENT NO.: 5,733,981

DATED: March 31, 1998

INVENTOR(S): William D. Coggio and Trang D. Pham

It is certified that error appears in the above-identified patent and that said Letters Patent is hereby corrected as shown below:

Column 6, line 5, detele "oft" and insert – of a --.

Column 10, line 46, (claim 10, line 3) delete "migrates" and insert –minutes--.

Signed and Sealed this

Seventeenth Day of November, 1998

Attest:

BRUCE LEHMAN

Attesting Officer

Commissioner of Patents and Trademarks